Dec. 18, 1928.
J. A. WOOD
VALVE
Filed May 9, 1927
1,696,070
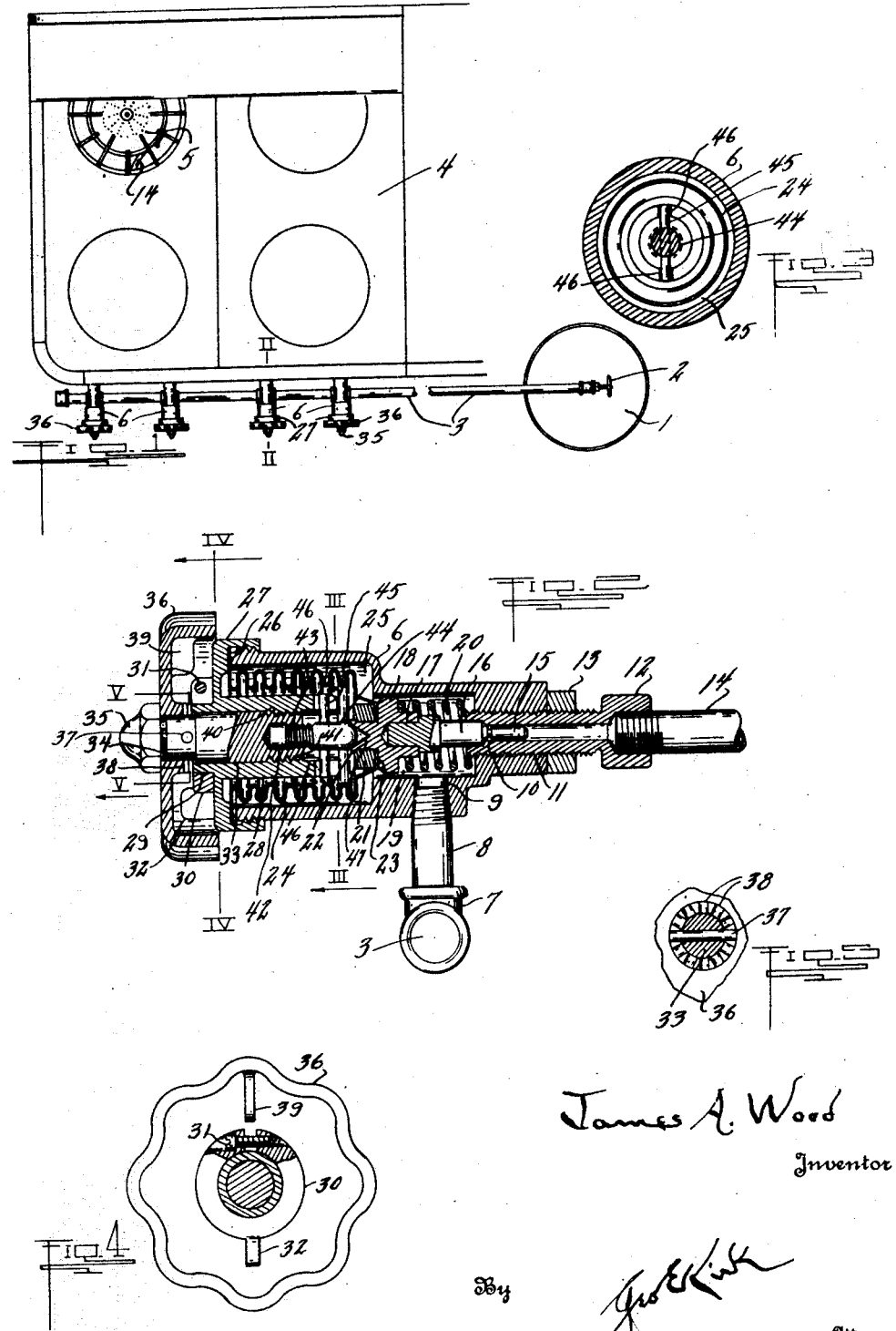
James A. Wood
Inventor
By [signature]
Attorney Patented Dec. 18, 1928.

1,696,070

UNITED STATES PATENT OFFICE.

JAMES A. WOOD, OF TOLEDO, OHIO, ASSIGNOR TO LIQUO-GAS COMPANY, OF ERIE, PENNSYLVANIA, A CORPORATION OF PENNSYLVANIA.

VALVE.

Application filed May 9, 1927. Serial No. 189,971.

This invention relates to opening and closing devices for a duct.

This invention has utility when incorporated as a packless control valve for gaseous fuel.

Referring to the drawings:

Fig. 1 is a plan view, with parts broken away, of an embodiment of the invention in a gas range;

Fig. 2 is a section on the line II—II, Fig. 1;

Fig. 3 is a section on the line III—III, Fig. 2;

Fig. 4 is a section on the line IV—IV, Fig. 2; and

Fig. 5 is a section on the line V—V, Fig. 2.

Compressed gas or fuel supply tank 1 is shown as having valve 2 as a main control mounted thereon, from which extends duct 3 to gas range 4 in which is mounted burners 5, with fuel control thereto, from the duct 3, by valves having housing 6. The supply duct 3 is provided with T-fittings 7 with nipples 8 extending into the housing 6 at intake port 9. Outlet port 10 has threaded connection 11 with the housing 6. This outlet port extends as a fitting 12 and is adjusted as to the housing 6 by lock nut 13. This fitting 12 has therefrom fuel supply duct 14 to burners 5.

Disposed in the outlet port 10 is guide stem 15 of closure plunger 16. This closure plunger 16 has press-fit or fixed assembly connection 17 with collar 18 thereby providing chamber 19 in the housing 6 with which the ports 9, 10 are in communication. Helical compression spring 20 in this chamber 19 tends normally to engage the collar 18 and thrust the closure 16 away from closing position as to the outlet port 10. Washer 21, opposing the collar 18 remote from the spring 20, has rivet assembly 22 with the collar 18 for solder or tight anchor connection 23 with extension diaphragm 24 of accordion type.

This diaphragm 24 extends away from the chamber 19 in the housing 6 in chamber 25 and terminates in outwardly extending flange 26 anchored by nut 27 with the housing 6. This nut 27 is provided with sleeve 28 extending into the chamber 25 within the accordion diaphragm 24. This sleeve 28 has remote from the chamber 19 extension 29 upon which is mounted split ring 30 adjustable by clamp screw 31 for positioning the stop 32. Mounted in the sleeve 28 is stem 33 having threaded terminus 34 upon which is mounted nut 35 for thereby clamping hand wheel 36 against pin 37 at the desired angular relation as to the stem 33. Corrugation 38 providing seats for this stem 37 permits angular shiftings of this hand wheel 36 for the desired location of the hand wheel 36 as to the stem 33.

This hand wheel 36 as inwardly extending wing or stop 39, which, in rotation of the hand wheel 36 may abut the stop 32 in thereby determining the degree of the angular rotation of the hand wheel. The stem 33 has threaded portion 40 coacting with threads 41 on the inner portion of the sleeve 28. Accordingly, rotation of the hand wheel 36 affects an axial movement of this stem 33 relatively to the valve housing 6.

This stem 33 has axially chambered portion 42 remote from the hand wheel 36. This chambered portion 42 is internally threaded for coacting with threaded portion 43 of supplemental stem 44. This supplemental stem 44 is provided with pin 45 engaging in notches 46 of the sleeve 28 thereby holding this supplemental pin 44 from rotation relatively to the housing 6. Accordingly, the rotation of the hand wheel 36, and with it of the stem 33 in effecting an axial movement of the stem 33, also effects an axial movement of the supplemental stem 44 for this stem 44 as threaded with the stem 33 may not rotate, but is held from rotation by the pin 45 engaging in the notches 46. There is accordingly therein, due to the differential threads 40, 43, a positive axial shifting of the supplemental stem 44 as to seat 47 fixed with the closure 16. This means that the threads 40, 43, being of different pitch, a considerable angular shifting of the hand wheel 36 may occur with micrometer axial shifting of the supplemental stem 44. Such shifting of the supplemental stem 44, away from the outlet 10, means that the spring 20 may thus be effective against the collar 18 for shifting the closure 16 into position for opening the port 10.

In the burning of gas, nicety in port opening is essential for efficient combustion. In the instances especially when burning casing head gases, it should be a port capacity with great nicety in adjustment in the desired capacity. With the plunger closure 15, 16, but slight movement gives a ring port opening and at such opening, very extreme refinement for flame height maintenance at the burners 5 may be obtained by the rotation of the hand wheel 36.

In order that there may not be inefficient combustion, say by too great supply of fuel which might even tend to blow out the flame, especially when under compressed gas tank supply, the hand wheel 36 has its opening maximum determined by the stops 39, 32. These are adjustable as circumstances may seem desirable, by re-positioning the stop 39 as to the stem 33 by slacking off the nut 35 for different recess engagement of the corrugations 38 with the pin 37. Instead of such adjustment, even for greater refinement than these corrugations 38, there may be shifting of the clamp 30 as to the sleeve extensions 29 and reclamping thereof by the bolt 31 for positioning the stop 32. In the operation of this valve, the flow of even these high pressure gaseous fuels into the chamber 19 may not bring about leakage from the housing 4 with the port 10 closed, for the chamber 19 is isolated from the differential flow device in the chamber 25 by the accordion diaphragm 24 as an extensible flexible connection. This means that the closure plunger 16 may be shifted by means outside of the chamber 19. As here shown, this shifting is against the action of the spring 20, and the spring 20 thus effects the opening of the port 10, and the differential flow device is a positive means for effecting the closing of the port 10.

What is claimed and it is desired to secure by Letters Patent is:

1. A valve having supply and discharge ports, a seat carrying member adjustable in one of said ports for varying the relationship of said seat and valve, a closure coacting with said seat, and a differential actuator for the closure.

2. A valve having supply and discharge ports, a seat carrying member adjustable in one of said ports for varying the relationship of said seat and valve, a closure coacting with said seat, and a differential screw device coacting for positioning the closure as to the seat.

3. A valve having supply and discharge ports, a seat carrying member adjustable in one of said ports for varying the relationship of said seat and valve, a closure coacting with said seat, a spring urging said closure in one direction, and a differential device opposing said spring for positively positioning the closure in the other direction.

4. A valve having a port, a closure for the port, a spring normally urging the closure into port opening position, a differential screw for opposing the spring in shifting the closure to port closing position, and a closure seat providing member adjustable in said port for varying the spring tension as urging the closure into port opening position.

5. A valve having a port, a closure for the port, a spring normally urging the closure into port opening position, a differential screw for opposing the spring in shifting the closure to port closing position, and a variable stop for the screw comprising a pair of abutments, one carried by the screw, each of said abutments being angularly adjustable as to its carrying means for varying the coacting relationship therebetween for the screw in limiting the open position of the closure.

6. A valve having an outlet port, a seat at the port entrance shiftable as to said valve, a plunger closure coacting with said seat and having a guide stem through said seat, a spring normally urging the closure into port opening position, and a differential screw device shiftable to permit spring shifting of the closure into opening position.

7. A valve housing having an outlet port, a passage providing adjustable member in said port forming a seat at said outlet port, a plunger closure having a guide stem into said adjustable member, a spring normally urging the closure into port opening position, a differential screw device shiftable to permit spring shifting of the closure into opening position, and an extensible diaphragm connection between the housing and closure.

In witness whereof I affix my signature.

JAMES A. WOOD.